(12) United States Patent
Gerald, II et al.

(10) Patent No.: US 8,227,105 B1
(45) Date of Patent: *Jul. 24, 2012

(54) UNIQUE BATTERY WITH A MULTI-FUNCTIONAL, PHYSICOCHEMICALLY ACTIVE MEMBRANE SEPARATOR/ELECTROLYTE-ELECTRODE MONOLITH AND A METHOD MAKING THE SAME

(75) Inventors: Rex E. Gerald, II, Brookfield, IL (US); Katarina J. Ruscic, Chicago, IL (US); Devin N. Sears, Spruce Grove (CA); Luis J. Smith, Natick, MA (US); Robert J. Klingler, Glenview, IL (US); Jerome W. Rathke, Homer Glen, IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 1228 days.

This patent is subject to a terminal disclaimer.

(21) Appl. No.: 11/939,721

(22) Filed: Nov. 14, 2007

Related U.S. Application Data

(63) Continuation-in-part of application No. 11/690,413, filed on Mar. 23, 2007, now Pat. No. 8,119,273.

(51) Int. Cl.
*H01M 2/16* (2006.01)

(52) U.S. Cl. ........ 429/145; 429/129; 429/131; 429/144; 429/246; 429/247; 429/320; 29/623.5

(58) Field of Classification Search .................. None
See application file for complete search history.

(56) References Cited

U.S. PATENT DOCUMENTS

| | | | | |
|---|---|---|---|---|
| 3,497,394 | A | * | 2/1970 | Berger .................... 429/300 |
| 3,736,186 | A | * | 5/1973 | Liang ..................... 429/323 |
| 5,756,062 | A | * | 5/1998 | Greinke et al. ........ 423/449.4 |
| 5,858,264 | A | * | 1/1999 | Ichino et al. ............. 252/62.2 |
| 6,447,958 | B1 | * | 9/2002 | Shinohara et al. ........ 429/248 |
| 6,586,133 | B1 | * | 7/2003 | Teeters et al. ............ 429/152 |
| 6,589,692 | B2 | * | 7/2003 | Takami .................... 429/199 |
| 2002/0031706 | A1 | * | 3/2002 | Dasgupta et al. ......... 429/212 |

* cited by examiner

*Primary Examiner* — Ula C Ruddock
*Assistant Examiner* — Tony Chuo
(74) *Attorney, Agent, or Firm* — Mark C. Lang; Brian J. Lally; John T. Lucas

(57) ABSTRACT

The invention relates to a unique battery having a physicochemically active membrane separator/electrolyte-electrode monolith and method of making the same. The Applicant's invented battery employs a physicochemically active membrane separator/electrolyte-electrode that acts as a separator, electrolyte, and electrode, within the same monolithic structure. The chemical composition, physical arrangement of molecules, and physical geometry of the pores play a role in the sequestration and conduction of ions. In one preferred embodiment, ions are transported via the ion-hoping mechanism where the oxygens of the $Al_2O_3$ wall are available for positive ion coordination (i.e. $Li^+$). This active membrane-electrode composite can be adjusted to a desired level of ion conductivity by manipulating the chemical composition and structure of the pore wall to either increase or decrease ion conduction.

22 Claims, 9 Drawing Sheets ized by lithium ion conductivities of order $10^{-6}$ S cm$^{-1}$ at ambient temperatures. This level of conductivity is not sufficient for many consumer battery applications.

UNIQUE BATTERY WITH A MULTI-FUNCTIONAL, PHYSICOCHEMICALLY ACTIVE MEMBRANE SEPARATOR/ELECTROLYTE-ELECTRODE MONOLITH AND A METHOD MAKING THE SAME

RELATION TO PREVIOUS PATENT APPLICATIONS

The present application is a continuation in part of, and claims priority to U.S. Non-Provisional patent application Ser. No. 11/690,413 filed on Mar. 23, 2007, now U.S. Pat. No. 8,119,273, which claims priority to U.S. Non-Provisional patent application Ser. No. 11/031,960 filed on Jan. 7, 2005, now abandoned, which claims priority to U.S. Provisional Patent Application No. 60/535,122 filed on Jan. 7, 2004, by instant inventors, all of which are hereby incorporated by reference in their entireties.

U.S. GOVERNMENT RIGHTS

The United States Government has rights in this invention pursuant to Contract No. W-31-109-ENG-38 between the U.S. Department of Energy and the University of Chicago, representing Argonne National Laboratory.

TECHNICAL FIELD

The invention relates to a unique battery having an activated membrane/electrode monolith and method of making the same. More specifically one preferred embodiment of the present invention is a monolithic system employing a novel physicochemically active membrane separator/electrolyte/electrode (PAMSEE) monolith, which acts as a separator and electrolyte, and an integrated electrode.

BACKGROUND OF THE INVENTION

Increased use of consumer electronics such as cellular telephones, laptop computers and other portable devices, and the development of new technologies like electric vehicles (EV) has increased the demand for compact, durable, high energy capacity batteries. This demand is currently being filled by a variety of battery technologies including traditional lithium-ion batteries. The flammable liquid electrolyte contained in lithium-ion batteries poses a safety hazard and must be securely contained by the battery package. However, the metal and plastic packaging of traditional batteries makes them heavy, thick, prone to leakage and difficult to manufacture. New generations of solid-state batteries are emerging that allow the fabrication of consumer batteries in a wide variety of shapes and sizes that are thinner, safer and more environmentally friendly. However, state of the art, solid-state batteries have several shortcomings including relatively low values of ion conductivity.

Lithium polymer electrolytes have received considerable interest for use in solid-state batteries. These electrolyte systems are complex materials composed of amorphous and crystalline phases. It has been known since 1983 that the ion motion in polymer electrolytes occurs predominantly in the amorphous phase. Accordingly, the conventional approach to improving ionic conductivity has been to investigate conditions that either decrease the degree of crystallinity or increase the segmental motion of the polymer matrix. However, despite significant improvements, modern lithium-ion batteries employing polymer electrolytes are limited by lithium ion conductivities of order $10^{-6}$ S cm$^{-1}$ at ambient temperatures. This level of conductivity is not sufficient for many consumer battery applications.

The $10^{-6}$ S cm$^{-1}$ conductivity ceiling was overcome by true solid-state batteries developed by Duracell in the 1970s which used pressed aluminum oxide ($Al_2O_3$) powder and Li salt (LiI) as the electrolyte material. See, U.S. Pat. No. 4,397,924 issued to Rea on Aug. 9, 1983 (Rea '924). The solid alumina electrolyte provided two orders of magnitude greater conductivity than polymer electrolytes. In one view, the lithium ions travel across the surfaces of alumina particles by hoping from oxide oxygen to oxide oxygen on the amorphous surface. (Kluger K, Lohrengel M, Berichte Der Bunsen-Gesellschaft-Physical Chemistry Chemical Physics, 95 (11): 1458-1461 NOV (1991)). However, this ion conduction only occurs when sufficient contact between adjacent alumina particles is both created and maintained. The Rea '924 patent overcame the first part of the contact problem by severely compressing the components at compressive strengths of order 100,000 psi. The result is a very dense solid-state electrolyte. However, overtime the ionic conductivity of the electrolyte decreased perhaps because the contact between particles degraded. This was especially expected when the electrolyte was subjected to shock or other mechanical trauma. Because Rea relied on physical compression to create contact between alumina particles, very small changes in the contact between the alumina particles could have a profoundly negative effect on the ion conduction of the material. In fact, it appears that this technology was virtually abandoned because of this limitation.

Recently porous anodized aluminum oxide (AAO) membranes were considered for use as battery materials by other researchers, however, the mechanism for lithium-ion conductivity of the membrane itself has neither been considered nor explored, nor has the modification and adjustment of the membrane. For example, U.S. Pat. No. 6,586,133 issued to Teeters et al., on Jul. 1, 2003 (Teeters '133) teaches a nano-battery or micro-battery produced by a process comprising: providing a membrane with a plurality of pores having diameters of 1 nm to 10 μm, filing said membrane with an electrolyte; and capping each filled pore with an electrode from about 1 nm to about 10 μm in diameter in communication with said electrolyte to form individual nano-batteries or micro-batteries. While Teeters '133 suggests the use of porous aluminum oxide membranes, it teaches the membranes solely as an innocuous, inactive, "jacket" for containing or housing nano or micro cells. The Teeters patent is directed solely to the creation of nano- and micro-size batteries and never teaches or even suggests using an active membrane to enhance the ion conductivity of the electrolyte in a synergistic manner. For example, the preferred pore diameter range of Teeters' system (up to 10 microns) is much too large for meaningful ion conductivity enhancement by the metal oxide membrane itself. Teeters teaches miniaturization of existing battery technology for the purpose of providing power to micro-scale machines. Furthermore, Teeters teaches the use of AAO membranes with low pore densities and porosities which are inadequate for producing effective active (highly conductive) membranes. Thus, the membrane pores of Teeters function as simple compartments for containing a stack of anode, electrolyte, and cathode materials to form a cell. Teeters also teaches that the anode and cathode material of the preferred embodiment are contained inside the pore of the AAO membrane. Teeters invention, can be fabricated equally well by employing a variety of materials having pores. The principle of Teeters is the miniturization of a battery cell using AAO as a micro-container, not as a material for enhancing the performance of the battery itself.

Mozalev, et al. teach a porous alumina membrane as the separator for macrobatteries. See, A. Mozalev, S. Magaino, H. Imai, Electrochimica Acta, 46, 2825 (2001). Their work suggested that alumina membranes mechanically suppress Li dendrite formation, thereby improving cycling efficiencies. However, they have not suggested or discussed the lithium-coordinating role that modified aluminum oxide membrane walls can play. The object of the Mozalev invention is to mitigate formation of dendrites by use of a hard material for a battery separator. Any hard, porous, material will serve the object of Mozalev's invention.

U.S. Pat. No. 6,705,152 issued to Routkevitch et al., discloses a type nano-structured ceramic platform for gas sensors. Routkevitch's sensors comprise micro-machined anodic aluminum oxide films having high density nano-scale pores, sensing materials deposited inside the self-organized network of nano-pores and at least one electrode deposited on the AAO. The gas permeable electrodes are deposited upon the AAO so to provide electronic conductivity without closing the pores to outside gases, so to enable gas sensing. The object of Routkevitch's invention is to make nano- or micro-sensing devices for detecting various substances at trace levels. Routkevitch teaches sensor devices that are open systems. Thus, the sensing materials deposited inside the network of nano-pores and the electrodes are continuously exposed to gas and liquid molecules from the ambient environment. A sensor device with blocked, clogged, or covered nano-pores is a closed system, and is not capable of performing the functions of sensing.

A major breakthrough in the room-temperature conductivity of lithium polymer electrolytes would significantly impact the rechargeable consumer battery market, as well as the emerging electric vehicle (EV) arena. Despite more than 20 years of active industrial and academic investigation, the current level of conductivity for lithium polymer electrolytes is not sufficient for many battery applications and suggests that a radical new approach based on a better understanding of ion transport is required. No prior art system provides a monolithic membrane which acts as a separator, electrolyte and electrode simultaneously.

SUMMARY OF INVENTION

The present invention relates to a unique battery system employing a novel multi-functional monolith that acts as a separator, electrolyte, and electrode (i.e. PAMSEE).

One embodiment of the invention relates a specialized battery produced by a process comprising:

a monolithic based membrane/electrode having a first and second side, the first side being a metal or metal alloy (electrode section or component) and the second side being an anodized metal oxide or oxidized metal alloy (membrane section or component), the m/e having a plurality of pores running the thickness of the second side of the base membrane/electrode terminating into the first side of the membrane, and wherein the base membrane/electrode pores have an inner wall; wherein the first and second sides each have an outer face, and wherein the pores have diameters ranging from about 2 nm to about 150 nm.

wherein the inner pore walls of the m/e are coated with a defined pore coating selected from the group consisting of: salts, anions, cations, ion conducting polymers compounds and combinations thereof, activated the membrane/electrode (i.e. transforming the m/e into a first physicochemically active membrane separator/electrolyte/electrode (PAMSEE) monolith);

a first outer electrode attached or deposited on the face of the PAMSEE second side, wherein the first side of the PAMSEE acts as the second electrode, wherein the first outer electrode covers the pores on the second side's face to form a first seal, and wherein the electrodes seal-off the pores from the ambient environment.

While prior art references teach the use of certain specialized materials like AAO as part of an electrolyte (Rea '924) and as a nano or micro-container for the creation of nano and macro batteries (Teeters '133), the prior art fails to teach or even suggest the use of well defined, physically and chemically active membrane separator, electrolyte, electrode PAMSEE (wherein the pores of the membrane section are coated with at least one ionic species) capable of ion-coordination and ion conduction of large quantities of charge (>1 mC), which act as both a separator, electrode and electrolyte. Unlike the innocuous membrane disclosed in Teeters '133, the membrane section of the novel PAMSEE is designed to transport large quantities of ions without the addition of an electrolyte to the pore. Thus, a key component in Teeter's invention, the electrolyte, is replaced by an activated membrane channel in the present invention.

The Applicants' invented battery employs a PAMSEE that acts as a separator, electrolyte, and electrode, within the same monolithic structure. In one preferred embodiment, ions in the AAO pores of the membrane section of the PAMSEE are transported via an ion-hoping mechanism where the oxygens of the $Al_2O_3$ wall are available for positive ion coordination (i.e. $Li^+$). This activated membrane/electrode can be adjusted to a desired level of ion conductivity by manipulating the chemical composition and structure of the pore wall to either increase or decrease ion conduction. Physical aspects of the active membrane section (i.e. pore size, porosity and tortuosity) can also be varied to control conductivity. This adjustability allows one to create customized membranes and batteries specifically tailored for a particular application. It may be preferable that the membrane be unidirectional for certain applications. The AAO portion (i.e. membrane section) of Applicants' invention is more fully described in U.S. Provisional Patent Application No. 60/535,122 filed on Jan. 7, 2004, and U.S. Non-Provisional patent application Ser. No. 11/031,960 filed on Jan. 7, 2005, by instant inventors, both of which are hereby incorporated by reference in their entireties.

A salient aspect of at least one embodiment of the present invention relates to an electrochemical cell having a multi-functional membrane/electrode composite, the membrane section of the membrane/electrode having physicochemically functionalized ion channels capable of adjustable ionic interaction, wherein the pores of said membrane section are modified by physical, chemical, or electrochemical means to impart atomic coordination sites for positive ions or negative ions transforming the membrane/electrode into a PAMSEE.

An advantage of at least one embodiment of the membrane/electrode of the battery is the ability to tailor the ion-conductivity of the membrane section (i.e. AAO portion) for specific uses. For example, ion-conductivity could be maximized for applications requiring fast responses and/or large amount of energy per unit time (i.e. EV acceleration) while ion conductivity could be lowered for less strenuous applications where high ion conductivity is not needed and/or if available would pose a safety hazard.

A salient aspect of at least one embodiment of the present invention is changing the physical characteristics of the membrane section of the membrane/electrode and its pores (i.e.

pore diameter, porosity, tortuosity etc.) in order to tailor the functionality of the separator/electrolyte membrane component.

Another embodiment of the present invention relates to a battery having a PAMSEE in which the second side or face is coated with an ion-conducting polymer creating a laminate-membrane that obviates problems associated with ion transport at the interface and polarization (i.e., the spatial depletion of ions in an electrolyte material such that a gradient in the ion concentration is formed, causing battery failure).

Another aspect of one embodiment of the invention relates to safety features of the PAMSEE which shut down the battery when critical temperatures are reached.

Yet another aspect of one embodiment of the invention relates to a synergistic membrane section of the PAMSEE component in which the walls of the membrane pores are coated with ions and a polymer material like polyethylene oxide and wherein the nanochannels of the AAO portion of the PAMSEE are preferably oriented normal to the electrodes, so as to provide the shortest path between them. Thus, the pore walls of this synergistic membrane section can act as a superhighway for maximizing ion conduction, allowing ions to travel via the hoping mechanism of the AAO portion of the membrane/electrode composite, via segmental motion via the polymer, via both mechanisms, or by a superposition mechanism.

An advantage of the present invention is a monolithic, multi-functional active membrane/electrode composite which acts a separator, electrolyte and electrode simultaneously.

DETAILED DESCRIPTION OF THE EMBODIMENTS

Figure 1A:
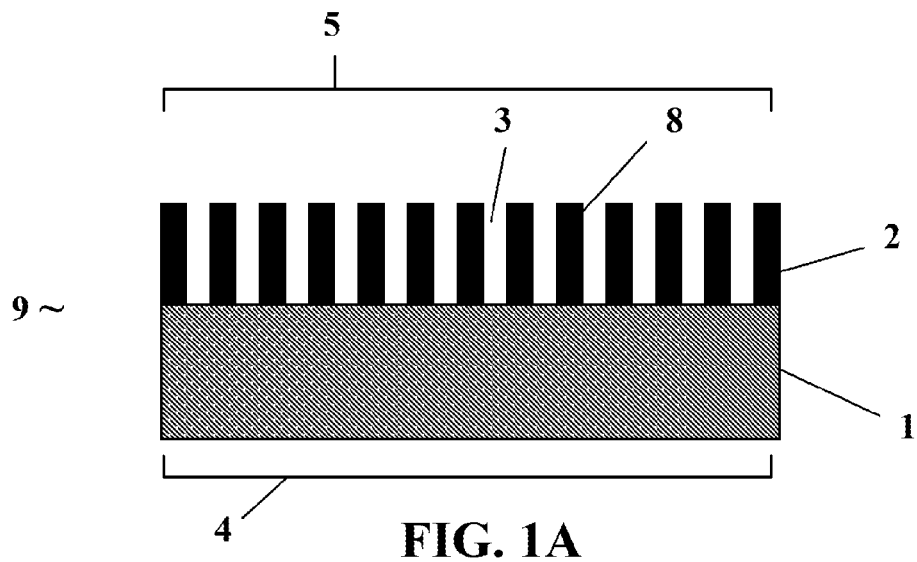
FIG. 1A—is a side cross-sectional view of one embodiment of the base membrane-electrode composite of the present invention.
Figure 1B:
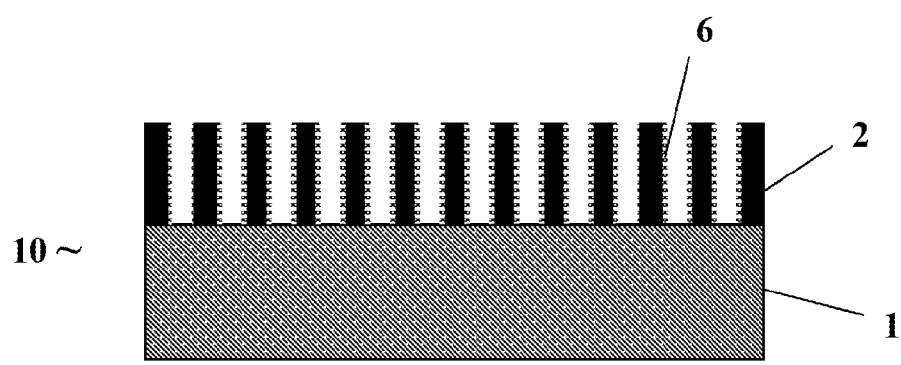
FIG. 1B—is a side cross-sectional view of one embodiment of the monolithic separator/electrolyte membrane-electrode composite of the present invention.
Figure 1C:
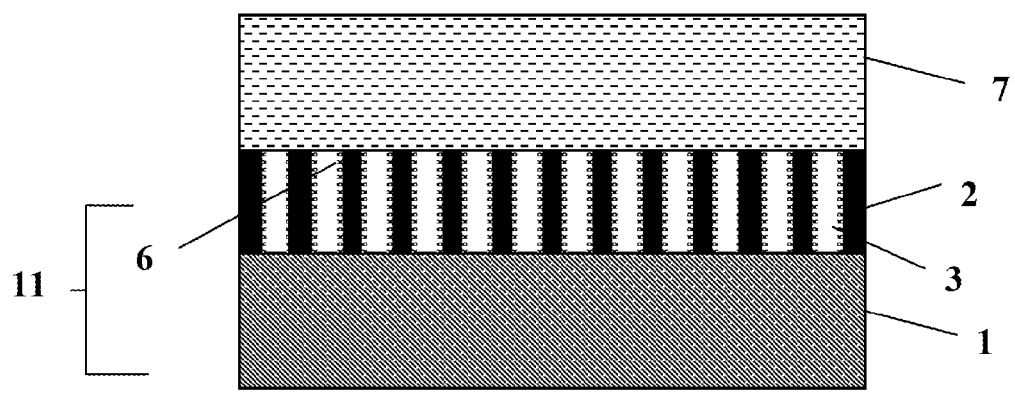
FIG. 1C—is a side cross-sectional view of one embodiment of the invented battery incorporating a monolithic separator/electrolyte membrane and a second electrode.

FIG. 1C illustrates one preferred embodiment of the invention comprising:

a monolithic physicochemically active membrane separator/electrolyte/electrode (PAMSEE) monolith 11 having a first 1 and second side 2 (each side having an outer face 4 and 5 see, FIG. 1A), the first side 1 (electrode section) being a metal (or metal alloy) and the second side 2 (membrane section) being an anodized metal oxide (or oxidized metal alloy), the PAMSEE having a plurality of pores 3 running the thickness of the second side terminating into the first side 1 and wherein the pores 3 have an inner wall covered with a defined coating 6; wherein the defined pore coating 6 is selected from the group consisting of: salts, anions, cations, ion conducting polymers compounds and combinations thereof;

a first outer electrode 7 attached or deposited on the second side's face wherein the first side 1 acts as the second electrode, wherein the first outer electrode 7 covers the pores on the second side's face to form a first seal, wherein the pores 3 have diameters ranging from about 2 nm to about 150 nm and wherein the electrodes (1 & 7) seal-off the pores 3 of the membrane from the ambient environment.

The PAMSEE monolith acts as a separator/electrolyte as well as an electrode. Details of the PAMSEE monolith are explained in detail below. In one preferred embodiment the PAMSEE monolith is created by coating the membrane pore walls 8 of a base membrane/electrode (FIG. 1A), creating a PAMSEE monolith having coated membrane pores 6 (FIG. 1B). Details of coating the pore walls are described herein. The PAMSEE monolith is then combined with an additional electrode to create a complete electrochemical cell (FIG. 1C).

Unique Separator/Electrolyte Membrane-Electrode

FIG. 1A illustrates one embodiment of a monolithic base membrane/electrode having a first side 1 and second side 2, the first side 1 being a metal (or metal alloy) and the second side 2 being an anodized metal oxide (or oxidized metal alloy), the base membrane/electrode having a plurality of pores 3 running the thickness of the second side 2 terminating into the metal of the second side (the metal of the second side acting as an electrode), and wherein the base membrane/electrode pores have an inner wall 8. The first side has an outer face 4. The second side has an outer face 5 as well.

The inner pore walls of the membrane/electrode 8 are coated with a defined pore coating 6, (see, FIG. 1B), wherein the defined pore coating 6 is selected from the group consisting of: salts, anions, cations, ion conducting polymers compounds and combinations thereof, producing a novel physicochemically active membrane separator/electrolyte-electrode (PAMSEE) monolith 10.

A salient feature of the invented electrochemical cell is the interaction of the channel walls of the PAMSEE with ions and compounds that have varying degrees of activity with ions. The monolithic membrane/electrode is preferably made by anodizing a metal (or metal alloy) to create a monolithic structure having a solid metal (or metal alloy) side and an anodized metal oxide (or metal alloy oxide) side. More preferably the membrane/electrode is made from aluminum creating a structure in which one side is solid aluminum and the other is porous anodized aluminum oxide.

Suitable metal oxides include but are not limited to amorphous titanium oxide, titanium dioxide, di-titanium trioxide, AAO (anodized aluminum oxide), amorphous aluminum oxide, di-aluminum trioxide, alumina, crystalline alpha aluminum oxide, crystalline beta aluminum oxide, crystalline gamma aluminum oxide, magnesium oxide, silicone oxide, vanadium oxide, zirconium oxide, germanium oxide, tin oxide, gallium oxide, indium oxide, iron oxide, chromium oxide, molybdenum oxide, nickel oxide, copper oxide, zinc oxide and combination thereof. Various metal alloy-oxides could also be used. Anodized aluminum oxide, "AAO", is a preferred metal oxide because of its adjustable physical pore structure and its good ion conducting ability.

The thickness of second side (anodized aluminum oxide side or membrane section) of the membrane/electrode 2 is a salient aspect of the invention and can be varied according to desired results. Membrane/electrodes having membranes sections with thicknesses greater than 30 microns (i.e. about 30-50 microns) posses greater mechanical strength, but also have higher levels of resistance and are preferable when a robust membrane (and battery) is desired. Membranes sections of (about 10 nm-1000 nm) are better suited for high-power battery applications that require low resistance. Membranes/electrodes having second sides of medium thickness (about 1 micron-30 microns) can be used for applications in between. Thin membrane sections are also useful in situations where the membrane is combined with a polymer, laminate or other substance that helps support the membrane (see, AAO-polymer hybrid and AAO-laminate discussed below).

The ability to control the dimensions of the pores in AAO makes it an ideal active membrane material. Controlling the physical and chemical properties of the membrane's pore walls allows the creation of customized membranes tailored for specific uses. It is well known in the art that when anodized under certain conditions, the AAO pores form a highly-ordered hexagonal arrangement of nano-channels perpendicular to the metal electrode (anode) surface; and the pore diameter, pore length, pore spacing and pore-ordering are all adjustable by varying the current, temperature, time, and choice of acidic electrolyte in which the membrane is grown (See, H. Masuda, M. Satoh, Jpn. J. Appl. Phys 35, 126 (1996), see also, J. Li C. Papadopoulos, J. M. Xu, and M. Moskovits, App. Phys. Lett. 75, 367 (1999); Masuda and K. Fukuda, Science 268, 1466 (1995); U.S. Pat. No. 6,139,713 issued to Masuda et al., and U.S. Pat. No. 6,705,152 issued to Routkevitch et al., of which are incorporated by reference in their entireties. The physical and chemical characteristics of the pore walls are important variables in controlling ion-conduction.

Figure 2:
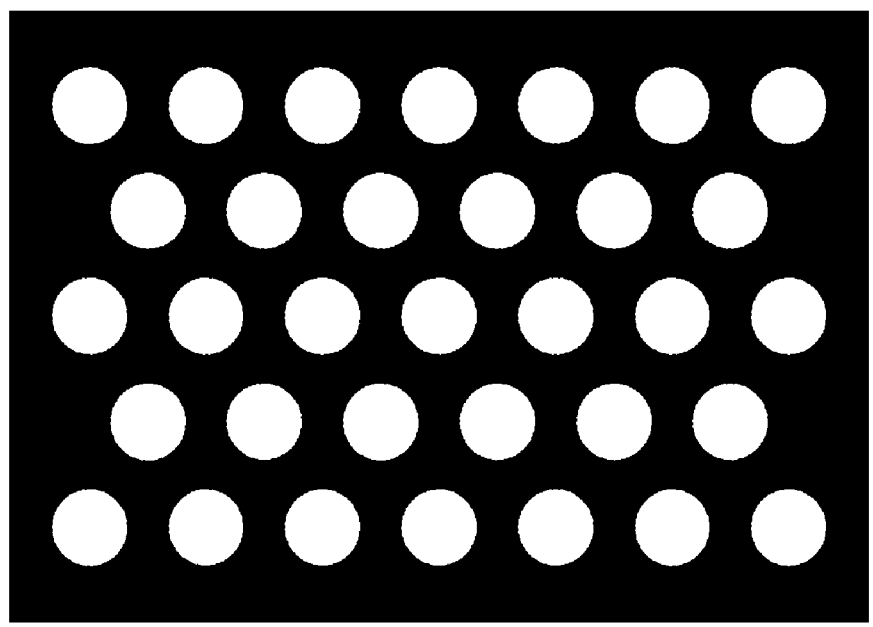
FIG. 2—is a top view of the second side of the separator/electrolyte-electrode membrane showing the hexagonal pore arrangement found in a preferred anodized aluminum oxide portion of the membrane.
Figure 3:
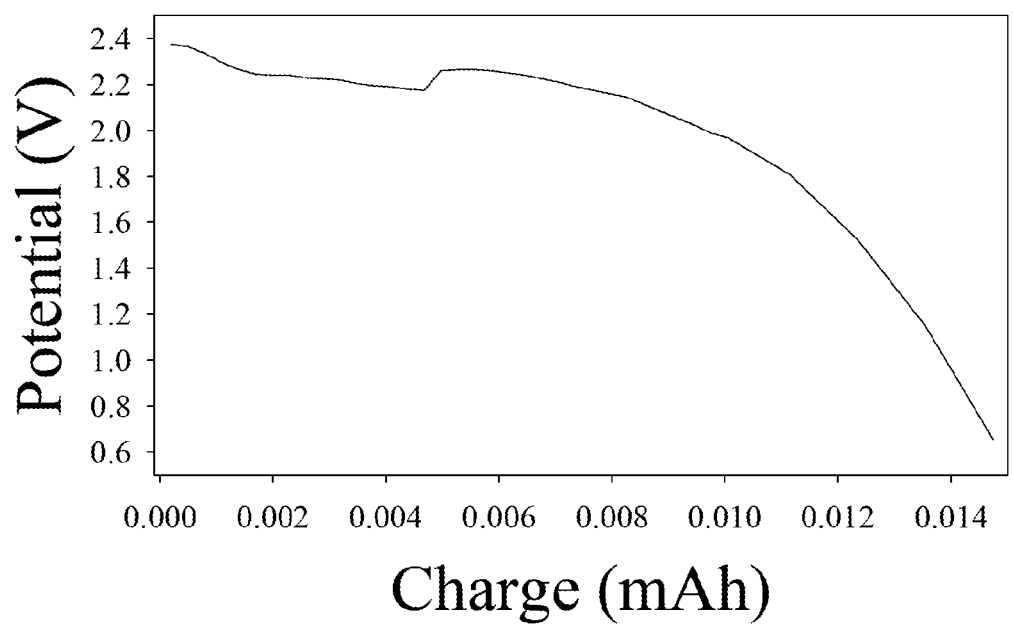
FIG. 3—is a graph of voltage plotted on the ordinate and time plotted on the abscissa representing the discharge curve of a cell comprised of an aluminum disk cathode, a porous monolith membrane of anodized aluminum oxide having the interior surfaces of the pores coated with a polymer electrolyte and functioning as a separator/electrolyte, and a lithium metal film anode.
Figure 4:
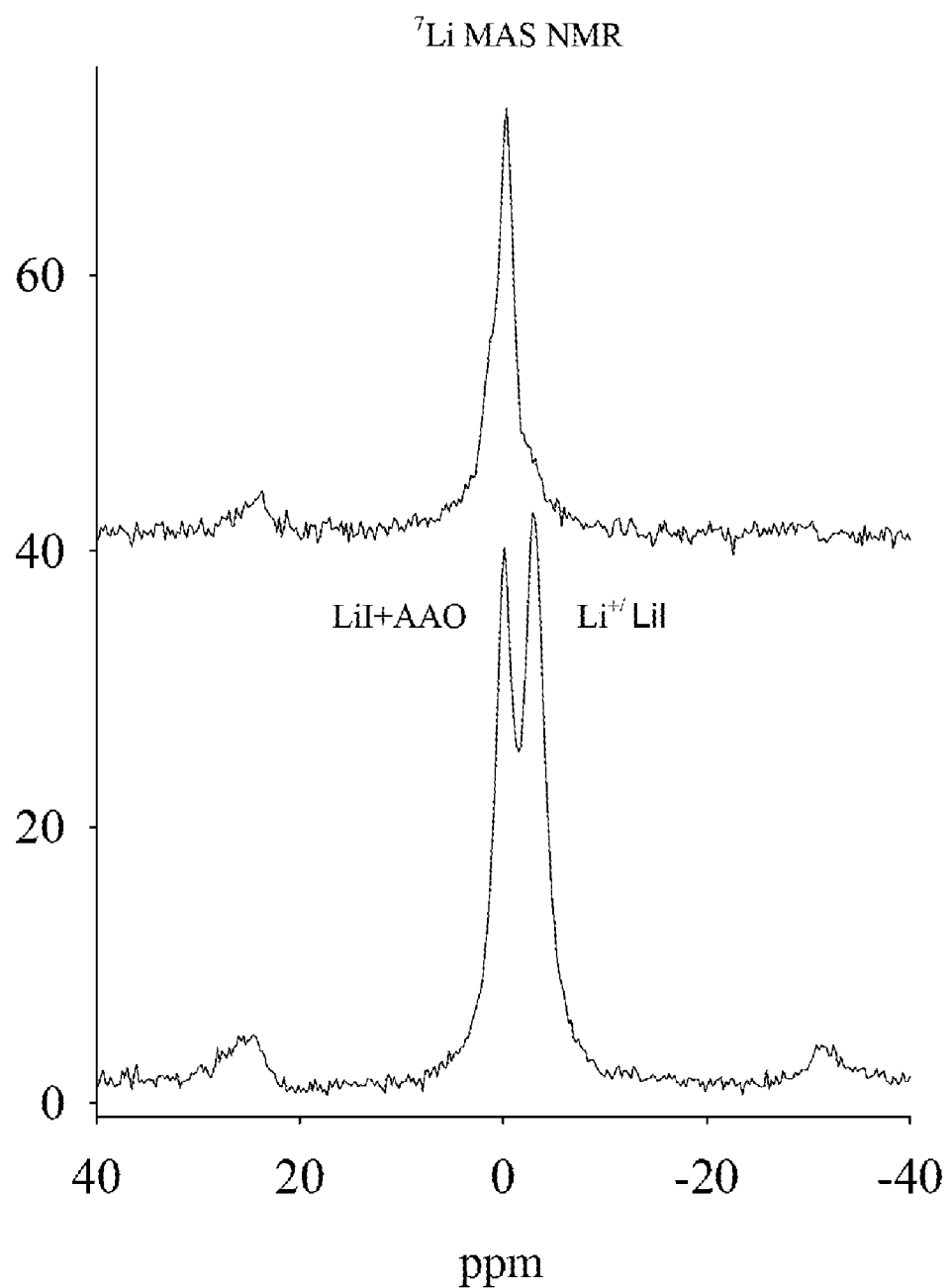
FIG. 4—depicts a $^7$Li MAS NMR spectrum of a LiI-coated AAO membrane (bottom) and LiI-coated nanoparticles from a separate source of alumina (top). The pore walls of the AAO membrane interact with LiI to produce highly mobile Li$^+$ ions. The LiI/AAO system shows that approximately 50% of lithium is ionic and highly mobile; the remainder of lithium is less mobile in LiI crystals. This spectrum shows that the walls have been coated with LiI and the walls have activated the lithium ions for conduction.
Figure 5:
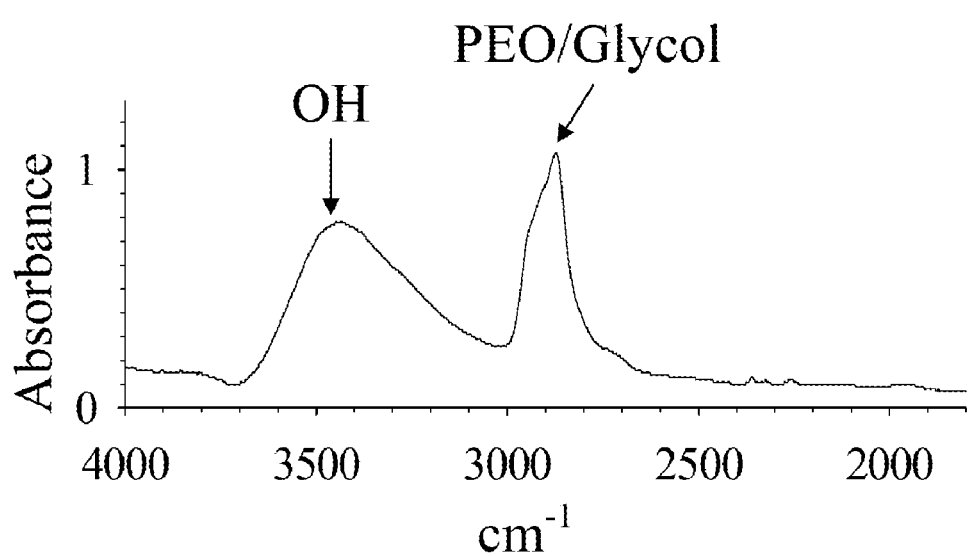
FIG. 5—is a FTIR spectrum of a poly(ethylene oxide)- and poly(ethylene glycol)-coated AAO membrane. The absorbance peak in the region 2800-2900 cm$^{-1}$ confirms a coating of poly(ethylene glycol) or other polyethers on the pore walls of the AAO membrane. The broad absorbance peak centered between 3400 and 3500 cm$^{-1}$ indicates that surface hydroxides and water molecules are also on the pore walls.

FIG. 2 illustrates the typical hexagonal arrangement of the pores 3 within the membrane portion of the membrane/electrode (second side).

Physical Modifications of the Membrane/Electrode

An important aspect of one embodiment of the invented PAMSEE monolith is the surface area to volume (SA:V) ratio of the membrane pores. The pores of one preferred embodiment of the invented membrane have a surface area to volume ratio in the range $2 \times 10^7$-$2 \times 10^9$ $m^{-1}$. A high SA:V ratio corresponds to high levels of ion coordination and transport by a fast ion-hoping mechanism on the membrane's pore walls. One achieves a high SA:V ratio by manipulating the diameter of the pores and the interpore spacing. Of course, one can manipulate the SA:V ratio to tailor the membrane for different applications.

Decreasing the diameter of the nano-channels of the membrane section, increases the SA:V ratio and in turn increases the amount of ion coordination by aluminum oxide and transport via its ion-hoping pathway. This allows control over the ion-coordinating ability of the AAO portion of the membrane/electrode composite monolith by manipulation of the pore size. The limited pore sizes of the membrane can also enhance the ion-coordinating ability of polymers and/or other species present within the pores due to confinement-induced steric constraints. That is, limited pore-diameter size constrains polymer molecules, which causes them to straighten out or adopt elongated chain conformations and thus become more efficient at transporting ions (unconstrained polymers wrap around ions to maximize coordination, and hinder rapid ion transport).

Although pore size can be adjusted, it is critical to the present invention that the pore diameter of the base membrane/electrode composite monolith is between about 2 nm-150 nm, to take advantage of the ion-hoping mechanism, and the advantageous effects of confined ion-conducting polymers. It is preferable to use pore size in the range of about 5-100 nm, and more preferably to use pore sizes in the range of about 5-50 nm.

Such a limited pore size range is in contrast to the prior art, which teaches a wide range of pore diameters. Membrane/electrodes with pore diameters greater than about 150 nm transport a majority of ion conduction via bulk electrolyte (if present) and not efficiently through the ion-hoping mechanism of AAO. Membranes/electrodes with pore diameters less than 5 nm may be unpractical as they are difficult to manufacture, can be difficult to chemically modify, and can be difficult to load with ions and polymer materials.

The porosity of the membrane/electrode composite monolith can also be used to tailor the ion conductivity. A suitable porosity range is between about 5-95%. The porosity depends on the intended use of the membrane device: low porosity (about 5-20%) for low-power battery applications; high porosity (about 20-65%) for high-power battery applications; highest porosity (about 65-95%) for very high power battery applications. See, also U.S. Pat. No. 6,627,344 issued to Kang on Sep. 20, 2003; U.S. Pat. No. 6,589,692 issued to Takami on Jul. 8, 2003; and U.S. Pat. No. 5,290,414 issued to Marple on Mar. 1, 1994, all of which are hereby incorporated by reference in their entireties.

The tortousity of the pores of the membrane/electrode composite monolith is the distance the ions travel in traversing the pore structure (ratioed against) divided by the geometric width of the membrane component. A tortuosity of unity is generally considered the ideal value for high rates of ion conductivity as it represents a membrane component having straight pores and thus the shortest distance between two opposite faces, the minimum distance between the anode and cathode of a battery. However, a membrane-component having tortuosity values greater than 1 may be used to create a separator/electrolyte with varying degrees of conductivity. It may be possible to manipulate the tortuosity by growing the AAO in a magnetic field and varying the angle of the magnetic field relative to the direction the AAO is grown.

Once the base membrane/electrode component has been made, its pores can be dilated by chemical etching, or contracted by processes such as atomic layer deposition and chemical vapor deposition. The first of the two pore-constricting processes can be used to fine tune the chemistry of the pore walls thereby changing the way in which the membrane component coordinates ions (i.e. $Li^+$).

Chemical Modifications of the Membrane Component

The ion coordinating ability of the second side (membrane section) of the membrane/electrode composite monolith can be altered by manipulating the chemical structure of the matrix of the pore wall surface. The pore walls can be chemically modified by coating the walls with an organic solution containing ions, an aqueous solution containing ions, an ion-conductive polymer, or combinations thereof, which enhance or retard the coordination and transport of ions. In addition, the charge of the metal oxide can be changed by treatment of the walls with acids or bases. Alternatively ion conducting salts or species can be melted or otherwise attached, absorbed or embedded in the pore wall surface activated the membrane/electrode into a PAMSEE. The coating of the pore wall has a thickness of less than about half the pore diameter of the base membrane.

Salt Coating of AAO Membrane Pores

The invented membrane separator/electrolyte-electrode monolith can be created by the addition of a variety of compounds and/or species to the pore walls, however, unlike prior art membranes; the present membrane/electrode composite monolith only requires the addition of a source of ions like a salt to become active. The active membrane/electrode is the novel producing a first physicochemically active membrane separator/electrolyte-electrode (PAMSEE) monolith.

Salt coatings can be added in a variety of ways including but not limited to: soaking the pore walls with various salt-containing solvents, spray-coating salt solutions, evaporative coating of volatile salts, melting salts directly onto the pore walls and combinations thereof. A variety of salts can be employed including numerous anhydrous salts.

When applying the salt using a solution, the pores are soaked with a solution containing the salt, and then the solvent is evaporated by techniques well known in the art (i.e. heat) leaving a salt coating on the walls of the pores.

In one embodiment the pore walls are treated with an organic solutions containing at least one ionic species. Suitable organic solutions include, but are not limited to those, containing one or more of: methanol, formamide, propylene carbonate, ethylene carbonate, .gamma.-butyrolactone, 1,3-dioxolane, dimethoxyethane, dimethyl carbonate, methylethyl carbonate, diethyl carbonate, tetrahydrofuran, dimethyl sulfoxide and polyethylene glycol dimethyl ether; combined with at least one salt selected from the group (selected from): lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), lithium bistrifluoromethanesulfonyl amide ($LiN(CF_3SO_2)_2$), and lithium triflate.

In another embodiment the pores are treated with an aqueous solution containing a salt or other ionic species. Suitable salts include but are not limited to: $ZnCl$, $AlCl_3$, $AlCl_3.6H_2O$, $Al(NO_3)_3$, $HCl$, $NH_4OH$, $H_2SO_4$, $NaOH$, $KOH$, $LiOH$, $CsOH$, $NaCl$, $KCL$, $CsCl$, $Al_2(SO_4)_3$.

Alternately, the pore walls can be directly treated by melting the salt onto the surface of the pore wall. Preferred salts include but are not limited to: lithium iodide, lithium bromide, lithium chloride, lithium fluoride and combinations thereof.

Individual anions and cations (i.e. $Li^+$ ions) can also be embedded into the surface matrix of the pore walls. Embedding ions into the matrix can be accomplished in a variety of ways including but not limited to the following: The AAO portion of the membrane/electrode composite monolith is dried and evacuated to create open and clean pores. The evacuated AAO is exposed to metal alkoxides such as tetraethyl orthosilicate or aluminum isopropoxide or mixtures of metal alkoxides, which are in solution in dry organic solvents such as hexane. Reactions between the metal alkoxides and surface hydroxyl sites anchor the metal alkoxides to the channel walls. The AAO portion of the membrane/electrode composite monolith is further treated by exposure to water vapor and or high temperatures to create a layered oxide surface. Bronsted acid sites, created via water and temperature treatments of the oxide layer, in a dried and evacuated AAO membrane can be further exposed to gaseous ammonia creating ammonium cation sites on the channel surface. Ammonium cations can be ion-exchanged for other cations such as lithium, sodium, rubidium, and cesium to create an ion-specific surface in the AAO portion of the membrane-electrode composite monolith.

The chemical composition of the membrane component itself can be modified to adjust the conductivity of the membrane. For example, mixed metal oxides can be employed to get desired conductivity results.

AAO-Alumina Membrane Component

Yet in another preferred embodiment the pores are coated with nano-particles of alumina allowing ion-conduction via the ion-hoping mechanism by creating multiple parallel pathways for ion-conduction in the AAO channels. The pores may also be coated with nano-particles of other metal oxides for similar purposes.

AAO-Polymer Hybrid Membrane Component

In another preferred embodiment, the pores of the membrane/electrode composite monolith 3 are coated with a layer of ion-conductive polymer, creating a synergistic AAO-polymer membrane/electrode device. Suitable polymers include but are not limited to: polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoride-hexafluoropropylene copolymer, poly(ethylene oxide), poly(propylene oxide), polyethylene glycols, polypropylene glycols, propylene carbonate, ethylene carbonate, dioctyl sebacate, diethyl phthalate, and derivatives of these polymers and combinations thereof.

The polymer material can be deposited in a variety of ways including but not limited to: adding a liquid solution of polymer in THF (tetrahydrofuran), or other volatile solvent, to the channels of the membrane drop-wise, and THF allowed to evaporate and disperse the polymer.

Although the thickness of the polymer coating can be varied, the thickness is preferably less than or equal to about half the pore diameter. Given that the diameters of pores are generally between 2-150 nm, a suitable range of polymer thickness is generally between about 1-149 nm, preferably between about 1-75 nm, dependent upon the diameter of the pores. The walls of the AAO-polymer hybrid membrane component should contain at least one ion conducting salt (or other ion conducting species). The salt can be coated on the walls of the AAO membrane component prior to the addition of the polymer or the salt can be incorporated within the polymer before the polymer is applied to the walls of the pores.

The hybrid polymer-AAO membrane component allows ion conduction via two different pathways: (1) the fast ion-hoping mechanism along the walls of the AAO pores and (2) a slower mechanism dependent on segmental motion through the polymer. It is believed that in certain embodiments, the two mechanisms work together in synergistic fashion to allow rates of ion conduction that exceed (or underseed) either of the mechanism working alone. This synergistic membrane can be customized for a wide range of applications.

For applications requiring very high ion conductivity, cat-ion conduction can be designed almost exclusively via a polymer-assisted fast hopping mechanism associated with alumina. This result is accomplished by limiting the use of the polymer to a thin film. The desirable film thickness is generally between about 1-20 nm thick, preferably 1-10 nm thick, most preferably between about 1-5 nm thick (along the surface of the AAO pore walls.) The pore walls of this synergistic membrane component act as a superhighway for ion-conduction, allowing ions to travel via the hoping mechanism on the AAO portion of the membrane-electrode composite monolith, via a segmental or modified segmental motion (due to polymer-AAO interactions) or possibly by a synergism of ion displacement mechanisms. Applications with lower ion conduction requirements could be designed by increasing the amount of polymer present within the pores and thus the percentage of ion coordination and transport via the bulk polymer segmental motion mechanism.

Laminated Membrane Component

In another preferred embodiment the outer face 5 (see FIG. 1A) of the second side 2 of the PAMSEE monolith (or first and second side in alternate double battery embodiment) is/are coated with a flat ion-conducting polymer film. This laminated PAMSEE monolith allows high ion conduction through the AAO portion of the membrane-electrode composite monolith and allows enhanced contact between the outer face 5 of the membrane component and electrode(s). A thin layer of soft polymer electrolyte coating on the outer face 5 of the membrane component creates a bridging effect between the hard and uneven interfacial surfaces of the electrode and the porous membrane component of the PAMSEE monolith that is beneficial for ion transport across the boundary region. In addition, the polymer electrolyte can permeate the porous electrodes and contact interior regions of a porous electrode. This very thin polymer layer improves the conductivity across the membrane separator/electrolyte-electrode interface, and obviates problems associated with polarization because ion diffusion over a thin polymer layer rapidly equalizes ion concentration gradients. Furthermore, the hybrid PAMSEE monolith overcomes many problems associated with previous very thin all-polymer membranes or thin polymer electrolyte films. For example, a mechanical puncture or breach of a polymer membrane separator can cause a dangerous short-circuit condition. The hard AAO membrane portion of the PAMSEE monolith would protect against mechanical puncture in the present embodiment. Thickness of the polymer coating ranges from about 1 nm to about 10 µm. The preferred thickness is determined by the surface roughness of the electrode and AAO membrane portion of the PAMSEE monolith. Smoother surfaces might only require a coating of about 1 µm or less. Rough surfaces require up to a about 10 µm thick (or even thicker) coatings. This represents an improvement over existing solid-state polymer electrolytes because in this application the polymer electrolyte film can be made much thinner. Thin films mitigate the polarization problem due to the sub-micron thickness of the films, a distance over which ion diffusion can rapidly equalize ion concentration gradients.

Conventional polymer electrolyte films are limited by the polarization effect. It is desirable to make these films as thin as possible, preferably less than about 10 µm, which were unsafe in the prior art due to short circuit safety concerns. However, thick films are required to prevent internal short circuit due to the roughness of the electrode surface. In our application, a very thin film can be employed with out short circuit hazards because of the hard AAO separator/electrolyte membrane located between the electrodes. The polymer can be a variety of polymers and can be deposited using a variety of techniques some of which have been discussed earlier in the polymer-hybrid embodiment. It should be noted that the laminate is added to an active membrane, the active membrane being described earlier (i.e. AAO-salt, AAO-polymer hybrid etc.).

Membrane Component w/Laminate Safety Fuse

Another embodiment incorporates a thermal safety fuse into the PAMSEE monolith. For example, a thin layer of porous, non-ion conducting material like polyethylene or polypropylene is deposited on the outer face 5 of the second side 2 of the PAMSEE monolith. The holes of the porous non-conducting material must allow access to the holes of the PAMSEE monolith so that ions can be conducted form cathode to anode in a cell. The polymer top-coat is designed to melt at a battery temperature where operation becomes unsafe, thus covering the active membrane holes with a non-ionically conductive material, and disengaging the battery circuit by inhibiting conduction. It should be noted that the laminate is added to an active membrane component, the active membrane component being described earlier (i.e. AAO-salt, AAO-polymer hybrid etc.) Included below are examples of some of the various embodiments of activated AAO portion of the PAMSEE monolith of the present invention.

Membrane Example I

Base Membrane/Electrode monolith w/Aluminum Electrode

IA.—Aluminum strips (6.0 cm×1.5 cm×0.15 mm) of 98% purity were immersed in 0.3 molal oxalic acid maintained at 276 K and anodized at 40 VDC, forming top and bottom transparent monolithic surface membranes having a metal (or metal alloy) interior and porous metal oxide (or metal alloy oxide) faces. The films were washed with deionized water, dried at 383 K for 15 minutes in air, and cooled under dry nitrogen. Removal of water coating the pore walls was accomplished by heating the membranes to 330 K under vacuum for two hours, or heating the membranes to 700 K under dry nitrogen.

IB.—Square pieces of aluminum foil (2.0 cm×2.0 cm×0.10 mm) of 99.999% purity were coated on one side with nail polished (to protect the covered side from anodization) and dried and then immersed in 0.3 molal oxalic acid maintained at 276 K and anodized at 40 VDC for three days until a transparent porous membrane was formed on the aluminum substrate. The films were washed with deionized water, dried at 383 K for 15 minutes in air, and cooled under dry nitrogen.

Removal of water coating the pore walls was accomplished by heating the membranes to 330 K under vacuum for two hours, or heating the membranes to 700 K under dry nitrogen.

IC.—The AAO templates with pore sizes of about 20, 50, and 100 nm were grown by potentiostatically anodizing aluminum plates (0.15 mm thick, 99.9+% purity) in an aqueous solution of 14% $H_2SO_4$, 4%, and 2% oxalic acid respectively, and at a voltage of approximately 20V, 50V, and 100V respectively.

ID.—A device, called the single-sided anodizer was developed and is available from Argonne National Laboratory (Argonne, Ill.) to anodize one side of a planar aluminum sample. This device was employed to synthesize AAO in circular and other shaped areas on aluminum sheets and disks. The aluminum sheet (of purity 99.999%) is actively cooled at the bottom face, and anodization is confined to the top face. Typically, an o-ring (diameter, 1.5 cm) is used to define a circular area that will be exposed to an aqueous 0.3 molal oxalic acid solution. A cylindrical container is made to compresses the o-ring to form a seal between the aluminum surface, the o-ring, and the open base of the container. The container is filled with the acid solution (approximately 10 ml), which is cooled to 275 K by contact with the cold aluminum. An aluminum metal strip cathode electrode is positioned in the acid solution at the top of the container. A potential of 40V DC is applied between the cathode (−) and the aluminum sample to be anodized, anode (+). The current and temperature are monitored by computer as the anodization process proceeds over a period of 1 week. The AAO sample is then removed and washed using distilled water.

The unanodized, residual side of the aluminum substrate creates an electorode that can act as either an anode or a cathode. An explained below another material is placed on the other side of the PAMSEE monolith to complete the battery system.

Another embodiment incorporates Anodized Aluminum Oxide protruding from both sides of an aluminum disk. If the AAO is created in this fashion, two other electrodes must be placed on the other sides of the PAMSEE monolith. This alternate embodiment is described in detail below.

Membrane Example II

Salt-Coated PAMSEE Monolith: Aluminum Electrode

IIA.—The pores in the AAO portion of the membrane/electrode monolith are coated with organic salts, such as lithium triflate and lithium dodecyl sulfonate, by the application of solutions of these salts in THF, followed by solvent evaporation at elevated temperatures in a nitrogen atmosphere. The PAMSEE monolith is heated by laying it flat on a heating mantel. The application of the salt solutions is done drop wise on the AAO face of the PAMSEE monolith.

IIB.—The pores in the AAO portion of the membrane/electrode monolith are coated with inorganic salts, such as lithium iodide and lithium bromide, by the direct application of these salts to the AAO face of the monolith and heating the monolith under nitrogen gas in a furnace to 400-500K or to the melting point of the salt. The monolith can be dried at 773 K in air and then coated with molten LiBr at the same temperature. The salt coating activates the base membrane/electrode transforming it into a PAMSEE.

IIC.—The Fabrication of a AAO+LiI Solid-State Electrolyte/Separator
A circular area of 1.3 cm diameter is selectively anodized on one side of a flat 2.5 cm×2.5 cm×0.0254 cm-thick piece of high purity (99.999%) aluminum metal using a single-sided anodizer system. The anodizer system consists of an o-ring that is compressed onto the top side of the aluminum surface using a cylindrical container with two openings; one opening fits over and compresses the o-ring, the other opening is used to fill the container with electrolyte and to insert the positive electrode. The cylindrical container contained 20 ml of a 0.3 m oxalic acid heavy water solution. The bottom side of the aluminum metal is placed on top of a semiconductor thermoelectric module (Peltier) cooler, which maintained the electrolyte solution at 3-5° C. The negative electrode is connected to the aluminum metal. A potential of 40 volts is applied between the two electrodes for a period of about 3 days. The aluminum metal substrate with a circular top section of porous anodized aluminum oxide (AAO) is floated on a pool of 2 M HCl acid solution containing dissolved $CuCl_2$; the aluminum metal was completely removed by oxidation after 20 minutes. The free-standing disk of porous AAO was rinsed with water. The thickness of the disk should be about 8 μm, measured by optical microscopy. The AAO disk is then dried under a stream of nitrogen gas.

Membrane Example III

Polymer Electrolyte and Salt-Coated PAMSEE Monolith: Aluminum Electrode

The pores 3 and outer face 5 of the second side 2 of an AAO portion of the PAMSEE monolith (see FIG. 1A) is coated with a layer of a polymer electrolyte to form a soft ion conducting interface between the outer face 5 and an electrode. The polymer electrolyte is composed of PEO and lithium triflate and has an oxygen to lithium ion ratio of 8:1, and is made by a well-know procedure. The pore walls 3 can be coated by placing the PAMSEE monolith on the surface of a hot plate and heating to 400 K in a dry nitrogen gas atmosphere. The polymer electrolyte can be smeared onto the surface of the AAO portion of the PAMSEE monolith and allowed to permeate the pores for a period of 10 minutes. Any excess polymer on the top (and bottom) face of the AAO portion of the PAMSEE monolith is removed from the surface leaving a thin surface layer. Complete and uniform coating of the pores with polymer electrolyte requires several minutes to several hours of heating; longer periods of heating may be required for thicker membranes.

Membrane Example IV

Polymer Electrolyte Laminate and Salt-Coated PAMSEE Monolith: Aluminum-Lithium Battery An exemplary laminate membrane can be fabricated by the following procedure. The pores of the AAO portion of the PAMSEE monolith are dried in an open-air furnace at 773 K and then coated with molten LiBr at the same temperature by placing anhydrous LiBr powder in contact with the membrane surface for 30 minutes.

The membrane is then cooled and transferred to a nitrogen atmosphere and heated on a hot plate to 400 K. A PEO/Li-triflate polymer electrolyte is smeared onto the surface of the AAO portion of the PAMSEE monolith and excess electrolyte is scraped off using a knife edge. A piece of lithium foil (anode) is contacted to the top surface of the laminate AAO portion of the PAMSEE monolith and the integrated aluminum electrode (cathode) is in contact with the bottom. A potential is measured across the two electrodes. The potential indicates the transport of ions through the thinly-laminated top surface and the pores of the AAO portion of the PAMSEE monolith.

Voltage measurements for lithium-ion cells employing $Al_2O_3$ separator/electrolytes (using the specified salts) include: 2.5 V/lithium triflate; 1.3 V/lithium dodecyl sulfate; 0.5 V/LiBr. These results and preliminary electrochemical discharge curves indicate that lithium ions encounter an oxygen environment on the AAO walls that coordinates ions and allows ion movement.

Electrodes

A physiochemcially-active membrane separator/electrolyte-electrode (PAMSEE) (or laminated PAMSEE) monolith, as described above, is paired with suitable first electrode (and sometimes second electrode) and hermetically sealed to form a functional electrochemical cell or battery. Unlike sensors, which are unsealed and inherently open systems, the present invention calls for the use of electrode(s) that cover and isolate the pores from environmental agents such as gases and liquids, thereby forming a hermetically sealed system. Operation of a closed battery system of the present invention requires that macroscopic quantities of an electroactive species contained within one electrode be transported through the nano-pores of the PAMSEE monolith to the other electrode. Exposure of the electrodes or the nano-pores of the PAMSEE monolith to environmental agents such as oxygen and water would irreversibly impede battery operation.

In battery applications, the separator/electrolyte-electrode membrane (PAMSEE monolith) is sealed. That is, the pore openings of the AAO portion of the PAMSEE monolith are covered and sealed by an electrode material that can take up and release macroscopic quantities of electroactive ions transported through the PAMSEE monolith pores. In a preferred embodiment, the AAO-based PAMSEE monolith and second electrode are hermetically sealed. The hermetic seal create a closed battery system, impermeable to outside gases.

A salient distinction between sensors and batteries is the quantity of charge that is transported through the nanopores. The optimal sensor device conducts a nano-scale level (nano-amps) or smaller current in response to an environmental agent such as a gas or liquid. The optimal battery device of the present invention conducts a macro-scale level (milliamps) or larger current in the charge and discharge process of battery operation. Sensors deliver minute currents to provide a response to the detection of trace quantities of a gas or liquid. Batteries deliver large currents to provide energy to a device such as a motor or computer to perform work. The key attribute of a sensor device with a linear response is very high sensitivity to the sensed analyte. High sensitivity requires very low sense currents, a sever limitation for a high-power battery. Batteries that deliver very low currents provide power to a limited number of devices.

It is a requirement that the composition of molecular species on the interior walls of the nano-pores in a sensor device changes dramatically when the sensor device is exposed to a gas or liquid molecular species (analyte). The magnitude of the sense signal is proportional to the quantity of adsorbed molecular species on the interior walls of the nano-pores in a sensor device. The composition of the molecular species on the interior walls of the nano-pores in a battery device of the present invention is essentially constant for the charge and discharge process of the battery operation.

The first (first and second in certain alternate embodiments) electrode materials are placed or deposited on the face(s) of the PAMSEE monolith. The electrodes can be made of a variety of materials known in the art, or the corresponding alkali or alkaline ion materials including but not limited to: $MoO_3$, $Cr_3O_5$, $V_2O_5$, $V_6O_{13}$, $LiV_3O_5$, $MnO_2$, $LiCoO_2$, $LiNiO_2$, $LiMn_2O_4$, $LiVO_2$, $LiCrO_2$, $WO_3$, $TiO_2$, $TiS_2$, $MoS_2$, $NiPS_3$, $TiSe_3$, $TiTe_2$, $MoS_2$, $MoSe_2$, InSe; coke, graphite, aluminum, $C_7CoCl_2$, poly(acetylene), poly(pyrrole), poly(vinylferrocene), poly(aniline), poly(p-phenylene), poly(phenylene sulfide).

The electrode materials can be attached to the PAMSEE using a variety of methods well known in the art including but not limited to various adhesives, mechanical attachments (i.e. coupling devices) or other materials or means. The electrode(s) may also be attached using methods known in the art including but not limited to melting the electrode materials onto the faces of the AAO membrane. Alternatively the electrode(s) can be deposited upon the PAMSEE using various techniques such as electrochemical deposition, electrophoretic deposition, and solution casting.

The electrode materials should be selected to correspond with the materials of the PAMSEE monolith so as to form a functional electrochemical cell system. The electrodes are preferably impermeable to gasses and liquids.

In an alternate embodiment one or more faces of the AAO separator/electrolyte-electrode are covered with a laminate before attachment of the electrodes, in one such embodiment an ion-conducting polymer is applied to the faces covering the pores of first and second faces of the AAO separator/electrolyte.

Exemplary Micro/Nano-battery Systems

Figure 6:
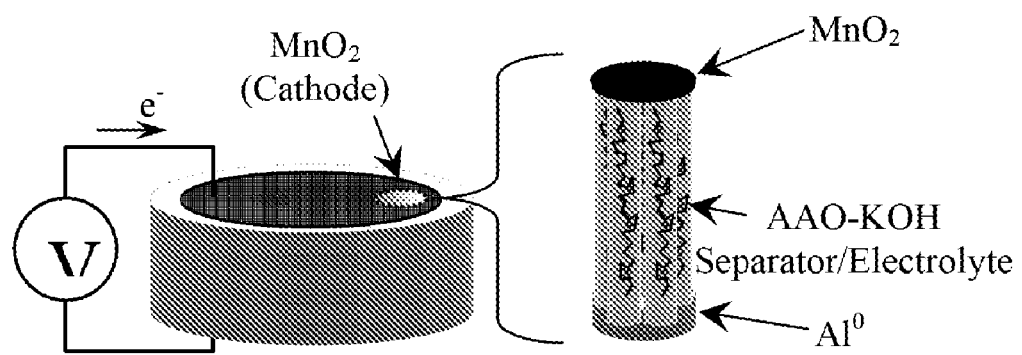
FIG. 6—illustrates one embodiment of the invented battery system having: a MnO$_2$ cathode and a monolithic separator/electrolyte membrane-aluminum anode composite.

FIG. 6 illustrates one embodiment of the invented battery system having: a $MnO_2$ cathode and an AAO-based membrane separator/electrolyte-aluminum electrode monolith. The pores of the AAO portion of the PAMSEE monolith were coated with KOH salt to create a PAMSEE monolith as described in detail above. The PAMSEE monolith acts as a separator, electrolyte, and electrode therefore, an additional electrolyte is not required as taught for membranes by the prior art.

Figure 7:
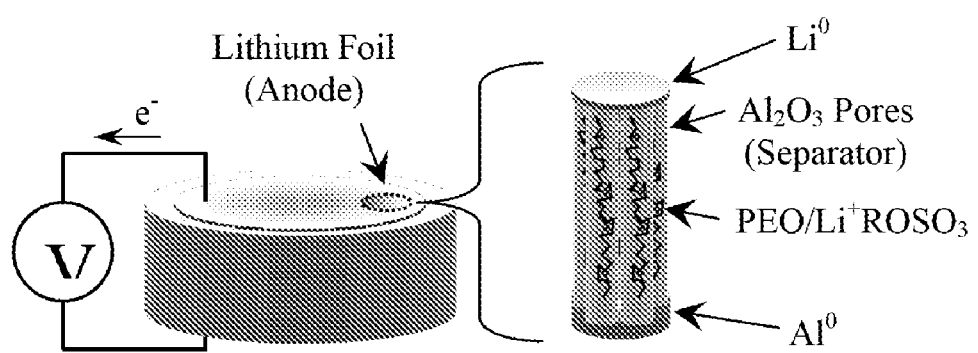
FIG. 7—illustrates yet another embodiment of the invented system comprising: a lithium anode and a monolithic separator/electrolyte membrane-aluminum cathode composite.

FIG. 7 illustrates another embodiment of the invented system comprising: a lithium (foil) anode, and a membrane separator/electrolyte-electrode monolith. In this case the AAO pores are coated with a polymer (i.e. PEO) which includes a salt (i.e. $Li^+ ROSO_3^-$) such as lithium triflate. The AAO-polymer/salt PAMSEE monolith acts as a separator, electrolyte, and electrode, therefore an additional electrolyte is not required as taught for membranes by the prior art.

Alternate Embodiment

Monolithic Double-Cell Battery
Separator/Electrolyte-Electrode

Figure 8:
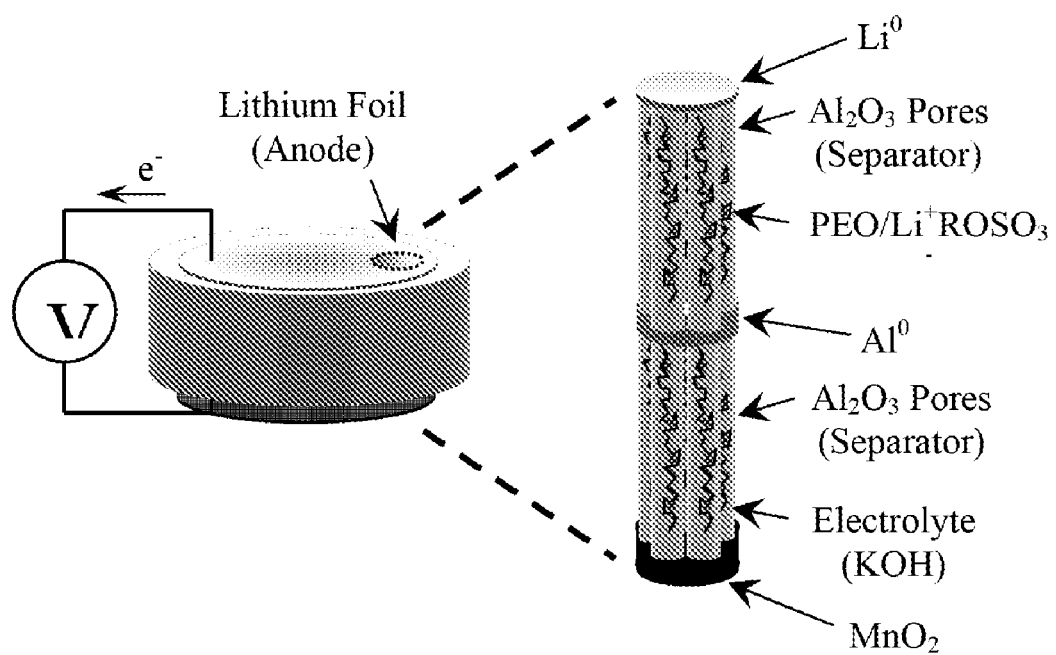
FIG. 8—illustrates yet another embodiment of the invented system comprising a novel back-to-back double-cell battery employing a monolithic dual separator/electrolyte membrane-aluminum back-to-back electrode.

FIG. 8 illustrates the membrane of the alternate double-cell battery embodiment, which is similar to that of the other embodiments except that anodized metal oxide is grown on both faces of a metal instead of just on one side. The result is a membrane that has a first section, a middle section, and a second section. The first and second AAO-based membrane sections act as separator/electrolyte monoliths. The middle section is a dual electrode, providing an electrode for the first and second sections.

Figure 9A:
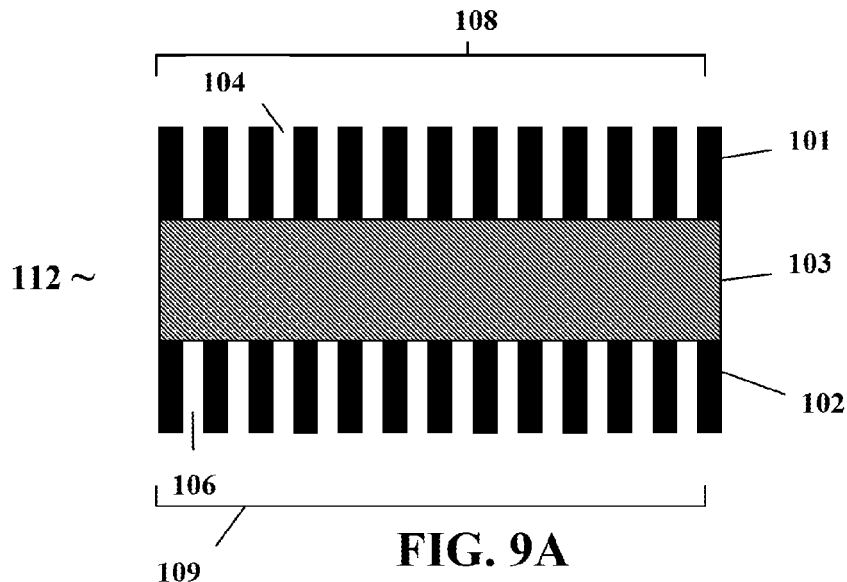
FIG. 9A—is a side cross-sectional view of an alternate double-sided embodiment of the monolithic dual separator membrane-aluminum electrode of the present invention.
Figure 9B:
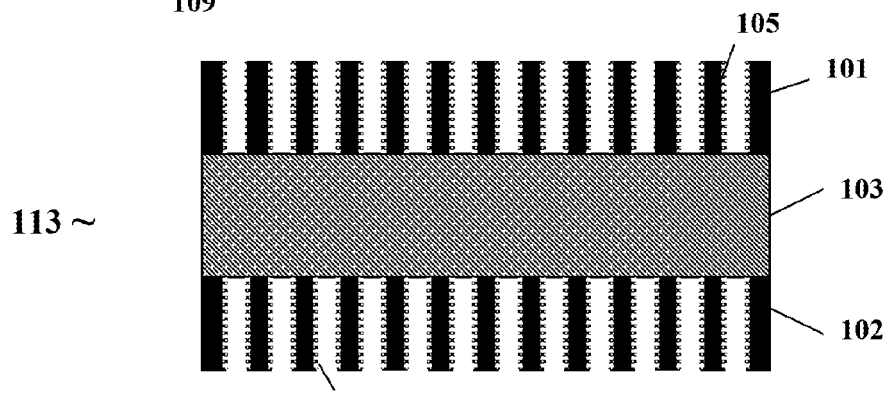
FIG. 9B—is a side cross-sectional view of an alternated double-sided embodiment of the monolithic dual separator/electrolyte membrane-aluminum electrode of the present invention.
Figure 9C:
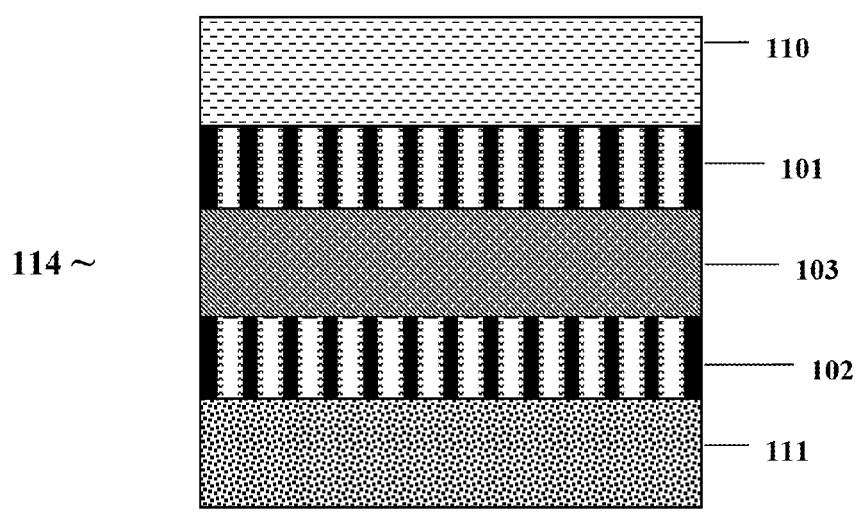
FIG. 9C—is a side cross-sectional view of an alternate double-sided embodiment of the invented battery incorporating a monolithic dual separator/electrolyte membrane-aluminum electrode and top and bottom electrodes.

FIGS. 9A-9C illustrates an alternate double-cell battery embodiment of the invention. The illustrated embodiment generally comprises a dual membrane separator/electrolyte-electrode monolith having a first section 101, a second section 102, and a middle section 103 situated in between the first and second sections; wherein the first 101 and second sections 102 are porous anodized aluminum oxide and the middle section 103 is aluminum metal; wherein a series of uniform, physiochemically active and functionalized ion pores 104 capable of adjustable ionic interaction run the width of the first section 101;

wherein a series of uniform, physiochemically active and functionalized ion pores 106 capable of adjustable ionic interaction run the width of the second section 102;
wherein both the first 101 and second sections 102 act as both an electrolyte and a separator;
wherein the middle section 103 acts as a first electrode for both first 101 and second section 102;
wherein the pore walls of the first section 101 and have a coating 105;
wherein the pore walls of the second section 102 have a coating 107;
attaching a second electrode 110 to the first section 101 of the monolithic membrane; attaching a third electrode 111 to the second section 102 of the monolithic membrane. The double-cell battery is created by first creating a double sided base membrane (FIG. 9A) which is then modified by coating the membrane pore walls with a defined coating creating a double sided PAMSEE (FIG. 9B). The double sided PAMSEE is then transformed into a double-cell battery by the attachment of two outer electrodes.

Preparing Monolithic Double-Cell Battery Separator/Electrolyte-Electrode

Aluminum strips (6.0 cm×1.5 cm×0.15 mm) of 98% purity were immersed in 0.3 molal oxalic acid maintained at 276 K and anodized at 40 VDC, forming top and bottom transparent monolithic surface membranes having a metal (or metal alloy) interior and porous metal oxide (or metal alloy oxide) faces. The films were washed with deionized water, dried at 383 K for 15 minutes in air, and cooled under dry nitrogen. Removal of water coating the pore walls was accomplished by heating the membranes to 330 K under vacuum for two hours, or heating the membranes to 700 K under dry nitrogen. The pores in the AAO portion of the PAMSEE monolith are coated with organic salts, such as lithium triflate and lithium dodecyl sulfonate, by the application of solutions of these salts in THF, followed by solvent evaporation at elevated temperatures in a nitrogen atmosphere. The PAMSEE monolith is heated by laying it flat on a heating mantel. The application of the salt solutions is done drop wise on the AAO face of the PAMSEE monolith.

Alternatively, the pores in the AAO portion of the PAMSEE monolith are coated with inorganic salts, such as lithium iodide and lithium bromide, by the direct application of these salts to the AAO face of the PAMSEE monolith and heating the PAMSEE monolith under nitrogen gas in a furnace to 400-500 K or to the melting point of the salt. The PAMSEE monolith can be dried at 773 K in air and then coated with molten LiBr at the same temperature. An electrode composed of MnO2 is attached to one side of the double-cell PAMSEE monolith and a lithium electrode is attached to the other side. Both electrodes provide impervious gas/liquid barriers for the AAO-based membranes of the PAMSEE monolith.

Electrodes and Modification of Alternate Membrane

The electrodes of the alternate double-cell battery embodiment can be attached and/or deposited as described previously and may be of the same type of materials as discussed in detail above. Modifying the pores of the membrane can also be modified as discussed above.

In the illustrated embodiment shown in FIG. 8, a Li anode is attached and/or deposited on the open outer face of the first section of the membrane completing the first half of the double-cell battery where the middle aluminum section acts as a cathode. A $MnO_2$ cathode is attached and/or deposited to the open face of the second section completing the second half of the double-cell battery where the middle aluminum section acts as the anode.

In the illustrated embodiment a polymer coating is applied to the pore walls of the first section of the membrane and a KOH coating is applied to the pore walls of the second section prior to the deposition and/or attachment of the electrodes. Although the illustrated embodiment shows a preferred embodiment the pore walls can be coated with a variety of coatings as discussed in detail above.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of the elements or sequences, or the use of numbers, letters or other designations thereof, is not intended to limit the claimed processes to any order except as may be specified in the claims. All ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like refer to ranges which can be subsequently broken down into sub-ranges as discussed above. Accordingly, the invention is limited only by the following claims and equivalents thereto.

All publications and patent documents cited in this application are incorporated by reference in their entirety for all purposes to the same extent as if each individual publication or patent document were so individually denoted.

We claim the following:

1. A specialized battery with a physicochemically active membrane separator/electrolyte/electrode (PAMSEE) produced by a process comprising:

providing a membrane/electrode monolith having a first and second side, the first side being a metal and the second side being an anodized metal oxide, the membrane/electrode having a plurality of pores running the thickness of its second side terminating into its first side, wherein the pores have an inner wall, and wherein the first and second sides each have an outer face;

coating the inner pore walls with a defined pore coating, wherein the defined pore coating is selected from the group consisting of: salts, anions, cations and combinations thereof forming a PAMSEE, and further wherein the defined pore coating on the inside pore walls of the monolith has a thickness of less than about half the pore diameter;

a first outer electrode is attached or deposited on the second side's face, wherein the first outer electrode is positioned over and is in ionic communication with the pores of the second face of the monolith to form a first seal, wherein the pores have diameters ranging from about 2 nm to about 150 nm, wherein the first side of the monolith acts as the second electrode, and wherein the first outer electrode attached to the first side of the monolith seals-off the pores from the ambient environment, and further wherein the pores are not otherwise filled.

2. The battery of claim 1, wherein second side of the monolith is a metal-alloy oxide selected from the group consisting of: aluminum oxide, silicone oxide, titanium oxide, magnesium oxide, vanadium oxide, zirconium oxide, germanium oxide, tin oxide, gallium oxide, indium oxide, iron oxide, chromium oxide, molybdenum oxide, nickel oxide, copper oxide, zinc oxide and combinations thereof.

3. The battery of claim 1, wherein the second side's face of the monolith is made of anodized aluminum oxide (AAO).

4. The battery of claim 1, wherein the first and second electrodes are impermeable to gas and liquid, creating a closed battery system.

5. The battery of claim 1, wherein the second side's face of the monolith is coated with an ion-conducting polymer laminate prior to attachment or deposition of the electrode, wherein the laminate coating has a thickness between about 1 nm and 10 μm, and further wherein the laminate coating does not enter the membrane pores.

6. The battery of claim 1, wherein at least a portion of the pores have a tortuosity equal to 1.

7. The battery of claim 3, wherein the first outer electrode is constructed of materials selected from the group consisting of: $MoO_3$, $Cr_2O_3$, $V_2O_5$, $V_6O_{13}$, $LiV_3O_8$, $MnO_2$, $LiCoO_2$, $LiNiO_2$, $LiMn_2O_4$, $LiVO_2$, $LiCrO_2$, $WO_3$, $TiO_2$, $TiS_2$, $MoS_2$, $NiPS_3$, $TiSe_3$, $TiTe_2$, $MoS_2$, $MoSe_2$, InSe.; coke, graphite, aluminum, $CF_n$, $(C_2F)n$, $C_7CoCl_2$, poly(acetylene), poly(pyrrole), poly(vinylferrocene), poly(aniline), poly(p-phenylene), poly(phenylenesulfide) and combinations thereof.

8. The battery of claim 3, wherein the first electrode is lithium.

9. The battery of claim 3, wherein the first electrode is $MnO_2$.

10. The battery of claim 3, wherein the first electrode is lithium and the coating is a salt.

11. The battery of claim 3, wherein the first electrode is $MnO_2$ and the coating is an ion-conducting polymer.

12. The battery of claim 3, wherein the pore coating is selected from the group consisting of: salts, anions, cations and combinations thereof.

13. The battery of claim 3, wherein the pore coating consists of one or more salts.

14. The battery of claim 3, wherein the pore coating consists of one or more anions or cations.

15. The battery of claim 3, wherein the pore coating is imparted by melting a salt onto the inner walls of the pores, wherein the salt is selected from the group consisting of: lithium iodide, lithium bromide, lithium chloride, lithium fluoride, and combinations thereof.

16. The battery of claim 3, wherein the pore coating is imparted by: washing the membrane component of the monolith with an aqueous or organic solution, the solution containing a solvent and at least one ionic species; and evaporating the solvent.

17. The battery of claim 3, wherein the pore coating is imparted by: washing the membrane component of the PAM-SEE monolith with an organic solution, the solution containing a solvent and at least one ionic species; and evaporating the solvent, and wherein the organic solution contains at least one compound selected from the group consisting of: propylene carbonate, ethylene carbonate, gamma.-butyrolactone, 1,3-dioxolane, dimethoxyethane, dimethyl carbonate, methylethyl carbonate, diethyl carbonate, tetrahydrofuran, dimethyl sulfoxide, polyethylene glycol dimethyl ether, methanol, formamide, propylene carbonate, ethylene carbonate, .gamma.-butyrolactone, 1,3-dioxolane, dimethoxyethane, dimethyl carbonate, methylethyl carbonate, diethyl carbonate, tetrahydrofuran, dimethyl sulfoxide, polyethylene glycol dimethyl ether and combinations thereof.

18. The battery of claim 3, wherein the pore coating is imparted by: washing the pores of the monolith with an aqueous solution, the solution containing a solvent and at least one ionic species; and evaporating the solvent, and wherein the aqueous solution is selected from the group consisting of: sodium hydroxide, potassium hydroxide, ammonium hydroxide, lithium hydroxide, cesium hydroxide aluminum chloride, aluminum chloride hexahydrate, sodium chloride, potassium chloride, cesium chloride, aluminum nitrate, aluminum sulphate, aluminum chromate, ammonium chromate, sodium chromate, potassium chromate, $ZnCl$, $AlCl_3$, $AlCl_3 \cdot 6H_2O$, $Al(NO_3)_3$, $HCl$, $NH_4OH$, $H_2SO_4$, $NaOH$, $KOH$, $LiOH$, $CsOH$, $NaCl$, $KCl$, $CsCl$, $Al_2(SO_4)_3$ and combinations thereof.

19. The battery of claim 3, wherein the pore coating is a metal oxide and wherein the metal oxide is deposited by a process selected from the group consisting of: atomic layer deposition (ALD), chemical vapor deposition (CVD), chemical reaction with a gas, chemical reaction with a solution reagent, and combinations thereof.

20. The battery of claim 3, wherein the pore coating is an ion-conducting polymer.

21. The battery of claim 3, wherein the pore coating is an ion-conducting polymer, and wherein the ion conducting polymer contains at least one salt selected from the group consisting of: lithium perchlorate (LiClO.sub.4), lithium tetrafluoroborate (LiBF.sub.4), lithium hexafluorophosphate (LiPF.sub.6), lithium trifluoromethanesulfonate (LiCF.sub.3SO.sub.3), lithium bistrifluoromethanesulfonyl amide (LiN(CF.sub.3SO.sub.2).sub.2), and lithium triflate.

22. The battery of claim 3, wherein the pore coating is an ion conducting polymer selected from the group consisting of: polyether, polyethylene oxide, polypropylene oxide, polyacrylonitrile, polyvinylidene fluoride, polyvinylidene chloride, polymethyl methacrylate, polymethyl acrylate, polyvinyl alcohol, polymethacrylonitrile, polyvinyl acetate, polyvinylpyrrolidone, polyethyleneimine, polybutadiene, polystyrene, polyisoprene, vinylidene fluoridehexafluoropropylene coploymer, poly(ethylene oxide), poly(propylene oxide), polyethylene glycols, polypropylene glycols, propylene carbonate, ethylene carbonate, dioctyl sebacate, diethyl phthalate, derivatives of these polymers and combinations thereof.

* * * * *